Patented May 16, 1950

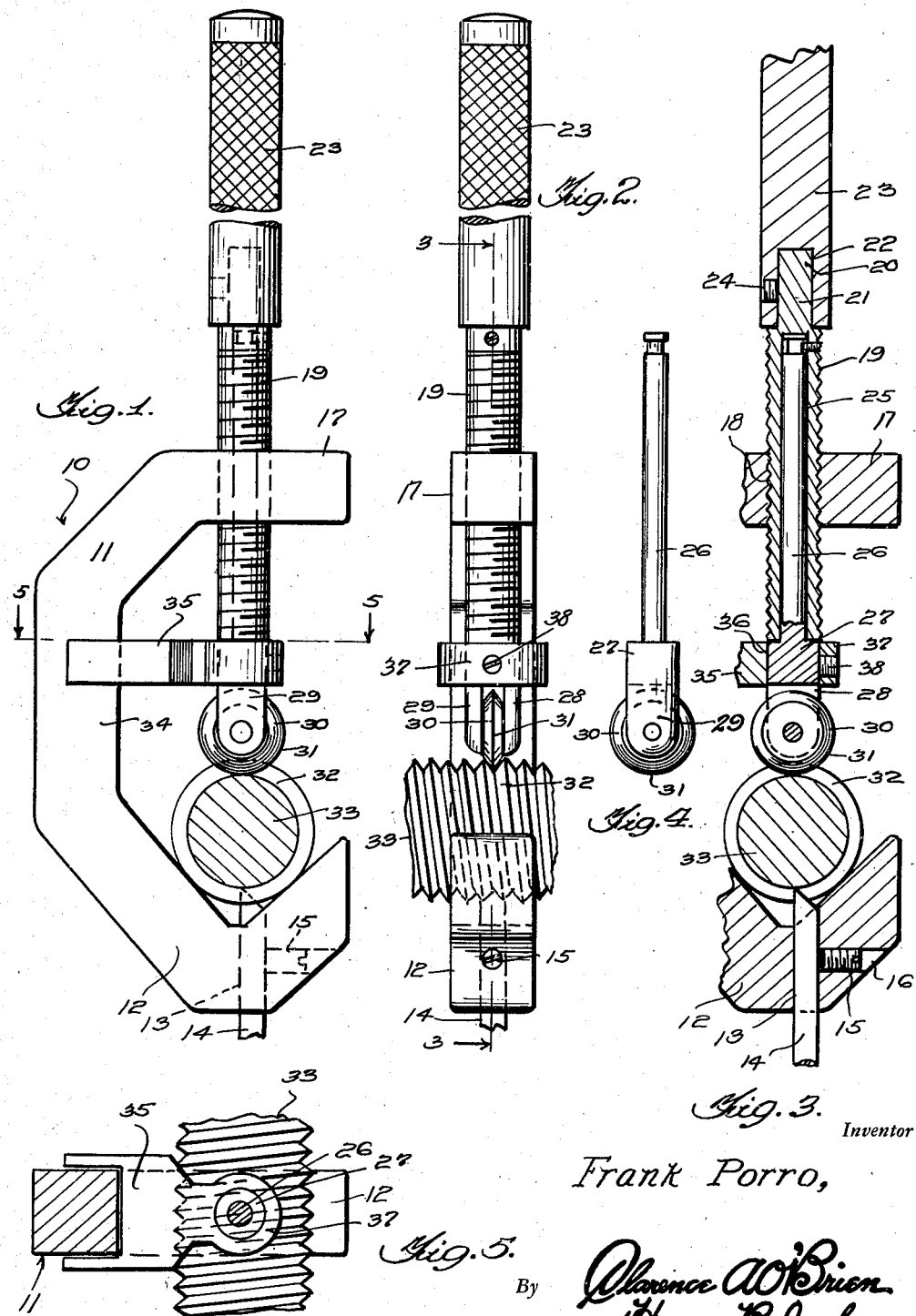
Frank Porro,

2,508,291

UNITED STATES PATENT OFFICE 2,508,291

RETHREADING TOOL

Frank Porro, Joliet, Ill.

Application June 9, 1945, Serial No. 598,583

1 Claim. (Cl. 10—1)

This invention relates to pipe fitters equipment and has for an object to provide a tool with which mutilated or worn threads of any diameter may be very quickly rethreaded.

Another object of the invention is to provide a wrench like tool provided with a cutter jaw and means for holding the same secured to a tube or rod the threads of which are to be repaired.

A further object of the invention is to provide in a tool of the above nature means for guiding a cutter in the track of a formerly cut thread.

Other features and advantages will become more readily apparent from the following description and the accompanying illustrative drawings in which:

Figure 1 is an elevational view of my invention,

Figure 2 is another elevational view thereof,

Figure 3 is a sectional view on line 3—3 of Figure 2,

Figure 4 is a detail of a wheel support, and

Figure 5 is a sectional view taken on line 5—5 of Figure 1.

In the accompanying drawings as above enumerated and in the following specification, like characters of reference indicate like parts throughout and in which 10 indicates my rethreading tool which consists of a frame member 11, terminating at one end in a V-shaped jaw 12, having an aperture 13, extending there-through for receiving a thread-cutting tool 14, which is held in fixed position by a set screw 15, threaded through the bore 16. The upper member 17, of the frame 11, is provided with the screw-threaded bore 18, into which is threaded a tubular shank 19, the upper end 20 of which is reduced as at 21, and projects removably into a bore 22, in a handle 23. These members are held together by means of a set screw 24. Rotatably mounted within the longitudinal bore 25, of member 19, is a shank 26, to the lower end of which is secured an integral bearing member 27, bifurcated to provide the bearings 28 and 29, for a guide wheel 30, the peripheral edge of which is shaped to the contour of a particular thread, such as the V-shaped (in cross-section) periphery 31, of the said wheel 30, which as will be noted in Figure 2 of the drawings, seats snugly within the threads 32, of the threaded member 33, to be repaired by the tool. Fixed to the central portion 34, of the member 11, is a guide member 35, having a bore 36, aligning with the bore 18, upon which the shank 19, loosely seats. In the terminal end 37, of the member 35, is a set screw 38, for holding the member 27, in a position whereby the wheel 30 will follow said threads 32.

From the foregoing description it will be seen that I have provided a very handy tool by means of which mutilated threads in a pipe or rod may be quickly repaired; it being only necessary to set the wheel 30 into the threads at the inner end thereof, adjust the tool to the member being repaired and then rotating the same until it reaches the outer terminal of the threads. The wheel 30 holds the member being repaired tight against the cutter point of the cutter 14.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details and parts such as come within the purview of the invention claimed may be resorted to, in actual practice, if desired.

Having now described my invention that which I claim as new and desire to procure by Letters Patent is:

A rethreading tool comprising a yoke having two arms and with a jaw on one arm, a thread cutting tool adjustably extending through said jaw, a tubular guide threadedly mounted in the other arm, a guide wheel and a bifurcated support therefor, the guide wheel being freely rotatively mounted in the support, the support having a shank portion pivotally and removably secured in said tubular guide, said guide wheel and support being replaceable, and a guide member securable to said yoke between said arms for supporting said bifurcated support and securing the support against pivotal movement relative to the yoke, said yoke having a portion parallel said tubular guide, said guide member having a slide bearing member removably securable to said bifurcated support and having a portion engaged with said portion of the yoke, the pitch spacing of the guide wheel and said thread cutting tool conforming to the pitch of the work.

FRANK PORRO.

REFERENCES CITED

The following references are of record in the file of this patent:

UNITED STATES PATENTS

| Number | Name | Date |
| --- | --- | --- |
| 343,233 | Esten | June 8, 1886 |
| 1,017,403 | Garbarino et al. | Feb. 13, 1912 |
| 1,215,121 | Cramer | Feb. 6, 1917 |
| 1,235,914 | Murrie et al. | Aug. 7, 1917 |
| 1,312,187 | Konigsberg | Aug. 5, 1919 |
| 1,371,660 | Akers et al. | Mar. 15, 1921 |
| 1,430,831 | Moxham | Oct. 3, 1922 |

FOREIGN PATENTS

| Number | Country | Date |
| --- | --- | --- |
| 1,648 | Great Britain | May 7, 1873 |
| 28,108 | Great Britain | Nov. 29, 1897 |